United States Patent
Kirsch (10) Patent No.: US 9,322,386 B1
(45) Date of Patent: Apr. 26, 2016

(54) HYDRO BLADE TURBINE SYSTEM

(71) Applicant: Jason Kirsch, Alba, TX (US)

(72) Inventor: Jason Kirsch, Alba, TX (US)

( * ) Notice: Subject to any disclaimer, the term of this patent is extended or adjusted under 35 U.S.C. 154(b) by 467 days.

(21) Appl. No.: 13/945,956

(22) Filed: Jul. 19, 2013

(51) Int. Cl.
*F03B 9/00* (2006.01)
*F03B 7/00* (2006.01)
*F03B 11/00* (2006.01)

(52) U.S. Cl.
CPC . *F03B 9/00* (2013.01); *F03B 7/006* (2013.01); *F03B 11/002* (2013.01)

(58) Field of Classification Search
CPC ............. F03B 9/00; F03B 9/05; F03B 7/006; F03B 11/002
See application file for complete search history.

(56) References Cited

U.S. PATENT DOCUMENTS

| | | | |
|---|---|---|---|
| 1,645,486 A | 10/1927 | Hardcastle | |
| 1,751,513 A | 3/1930 | Gaede | |
| 3,887,817 A | 6/1975 | Steelman | |
| 4,054,031 A * | 10/1977 | Johnson | F03B 17/02 415/7 |
| 4,805,406 A * | 2/1989 | Grsetic | F03B 17/02 60/496 |
| 5,555,728 A * | 9/1996 | Welch, Jr. | F01D 23/00 60/496 |
| 6,305,165 B1 * | 10/2001 | Mizuki, Sr. | F03B 17/02 60/495 |
| 7,216,483 B2 * | 5/2007 | Takeuchi | F03B 17/02 60/495 |
| 2010/0276934 A1 | 11/2010 | Francis | |
| 2010/0283250 A1 | 11/2010 | Capone et al. | |

* cited by examiner

*Primary Examiner* — Ninh H Nguyen
(74) *Attorney, Agent, or Firm* — Donald J. Ersler (57) ABSTRACT

A hydro blade turbine system preferably includes a housing, a current divider, a plurality of collapsible pockets, a pair of idler gears, a pair of drive gears, a pair of chains, an idler shaft and a drive shaft. Each one of the plurality of collapsible pockets include a first plate, a second plate, a hinge member, a pocket liner and a bobber. The plurality of collapsible pockets are pivotally engaged with the pair of chains. A first embodiment of the hydro blade turbine is located inside a chamber or a boiler. If a boiler is used, a lower end of the hydro blade turbine is located above a steam generation area of the boiler. A second embodiment of the hydro blade turbine uses ignited natural gas to propel the plurality of collapsible pockets. A third embodiment of the hydro blade turbine uses steam to propel the plurality of collapsible pockets.

17 Claims, 7 Drawing Sheets

HYDRO BLADE TURBINE SYSTEM

BACKGROUND OF THE INVENTION

1. Field of the Invention

The present invention relates generally to power generation and more specifically to a hydro blade turbine system, which may be utilized to generate energy from inside a chamber, tank or boiler.

2. Discussion of the Prior Art

U.S. Pat. No. 1,645,486 to Hardcastle discloses a current motor. U.S. Pat. No. 1,751,513 to Gaede discloses a water power generator. U.S. Pat. No. 3,887,817 to Steelman discloses a power generating device. Patent application no. 2010/0276934 to Francis discloses a system for generating electric power from fluid current. Patent application no. 2010/0283250 to Capone et al. discloses a fluid-based power generation system.

Accordingly, there is a clearly felt need in the art for a hydro blade turbine system, which may be utilized to generate energy from air bubbles rising inside a chamber, tank or a boiler.

SUMMARY OF THE INVENTION

The present invention provides a hydro blade turbine system, which may be utilized to generate energy from inside a chamber, tank or a boiler. The hydro blade turbine system preferably includes a housing, a current divider, a plurality of collapsible pockets, a pair of idler gears, a pair of drive gears, a pair of chains, an idler shaft and a drive shaft. The housing may be a boiler, a chamber or a tank. The housing preferably includes a pair of end plates, a U-shaped base, a front plate, a back plate and a U-shaped top plate. A first drive gear is retained on one end of the drive shaft and a second drive gear is retained on a second end of the drive shaft. A first end of the drive shaft is pivotally retained at a lower end of a first end plate and a second end of the drive shaft is pivotally retained at a lower end of a second end plate. A first idler gear is retained on a first end of the idler shaft and a second idler gear is retained on a second end of the idler shaft. A first end of the idler shaft is pivotally retained at an upper end of the first end plate and a second end of the idler shaft is pivotally retained at an upper end of the second end plate.

A first chain is retained around the first idler and drive gears and a second chain is retained around the second idler and drive gears. A first end of the current divider is attached to an inside surface of the first end plate, between the first idler and drive gears and a second end of the current divider is attached to an inside surface of the second end plate, between the second idler and drive gears. A first end of a plurality of pivot rods are attached around an outer perimeter of the first chain and a second end of the plurality of pivot rods are attached around an outer perimeter of the second chain.

Each one of the plurality of collapsible pockets include a first plate, a second plate, a hinge member, a pocket liner and a bobber. One edge of the first and second plates are secured to the hinge member. The pocket liner includes a first side portion, a second side portion, a first end portion and a second end portion. The pocket liner is fabricated from a flexible and waterproof material. A first side of the first and second side portions are attached to each other. The first and second end portions terminate the first and second ends of the first and second sides portions. The hinge member is pivotally retained on one of the pivot rods. At least one bobber is disposed between the first and second side portions, when the collapsible pocket is closed. As the plurality of collapsible pockets rotate under the drive gears, the at least one bobber causes the first and second side portions to separate due to its buoyancy in water. The at least one bobber slides-up and wedges itself between the first and second side portions.

A first embodiment of the hydro blade turbine is located inside a chamber or a boiler. If a boiler is used, a lower end of the hydro blade turbine is located above a steam generation area of the boiler. A top portion of the boiler encases the entire hydro blade turbine. When using the boiler, steam from a bottom of the boiler is captured by a steam manifold and directed into a plurality of open collapsible pockets. If a chamber is used, a bottom of the hydro blade turbine is located above a plurality of compressed air valves in a base of the chamber and the plurality of compressed air valves are directed into a plurality of partially open collapsible pockets. The air forces the plurality of collapsible pockets open and upward, which rotate the idler and drive gears. The drive shaft will pass through the first or second end plates and extend outside of the chamber. The hydro blade turbine system in a chamber may be utilized to generate energy from various sources of compressed air, such as wind, wave, tidal and geopressure inside a chamber.

A second embodiment of the hydro blade turbine uses ignited natural gas to propel the plurality of collapsible pockets. A gas propulsion device unit includes an ignition chamber, a supply of pressurized natural gas, a plurality of check valves and an ignition source. The supply of pressurized gas is connected to ignition chamber. The plurality of check valves extend from a from top of the ignition chamber. The ignition source is disposed inside the ignition chamber. The plurality of check valves are disposed at a bottom of the hydro blade turbine. Exhaust pressure from igniting the pressurized natural gas flows through the plurality of check valves and into the plurality of partially open collapsible pockets. The ignition process is repeated to rotate the hydro blade turbine.

A third embodiment of the hydro blade turbine uses steam to propel the plurality of collapsible pockets. The hydro blade turbine is retained in a chamber. A steam converter includes a cylinder, a disc and stabilizing rod. An air input and a pressurized air output are formed on a top end of the cylinder. An air output and a steam input are formed on a bottom of the cylinder. The stabilizing rod extends a length of the cylinder. A hole in a center of the disc is sized to receive the stabilizing rod. An outer perimeter of the disc contacts an inner perimeter of the cylinder. The disc falls to a bottom of the cylinder due to gravity. Excess air below the disc is pushed out from the air output. Pressurized steam is fed into steam input, which causes the disc to rise. The rising disc pushes air through the pressurized air output. The pressurized air is received by an air manifold located in a base of a housing. The air manifold is located to release air directly under the partially open collapsible pockets, which causes the hydro blade turbine system to rotate.

Accordingly, it is an object of the present invention to provide a hydro blade turbine system, which may be utilized to generate energy from steam generated inside a boiler.

It is a further object of the present invention to provide a hydro blade turbine system, which may be utilized to generate energy from various sources of compressed air, such as wind, wave, tidal and geopressure inside a chamber.

It is another object of the present invention to provide a hydro blade turbine system, which may be utilized to generate energy from the combustion of natural gas.

Finally, it is another object of the present invention to provide a hydro blade turbine system, which may be utilized to generate energy from air generated by steam to air converter.

DETAILED DESCRIPTION OF THE PREFERRED EMBODIMENTS

Figure 1:
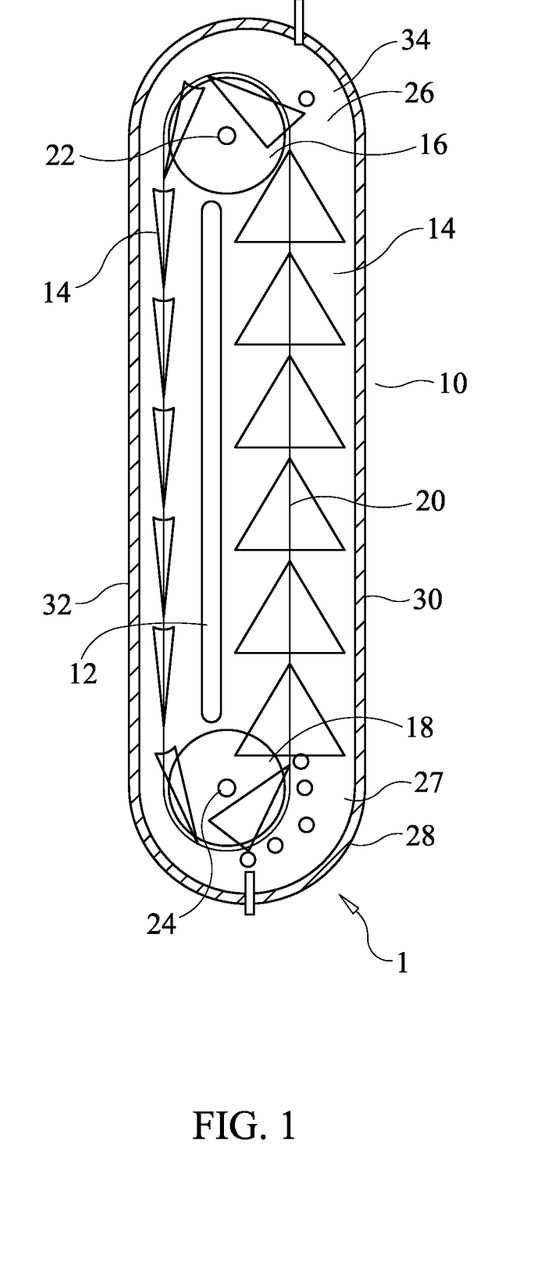
FIG. 1 is a cross sectional end view of a hydro blade turbine system in accordance with the present invention.
Figure 2:
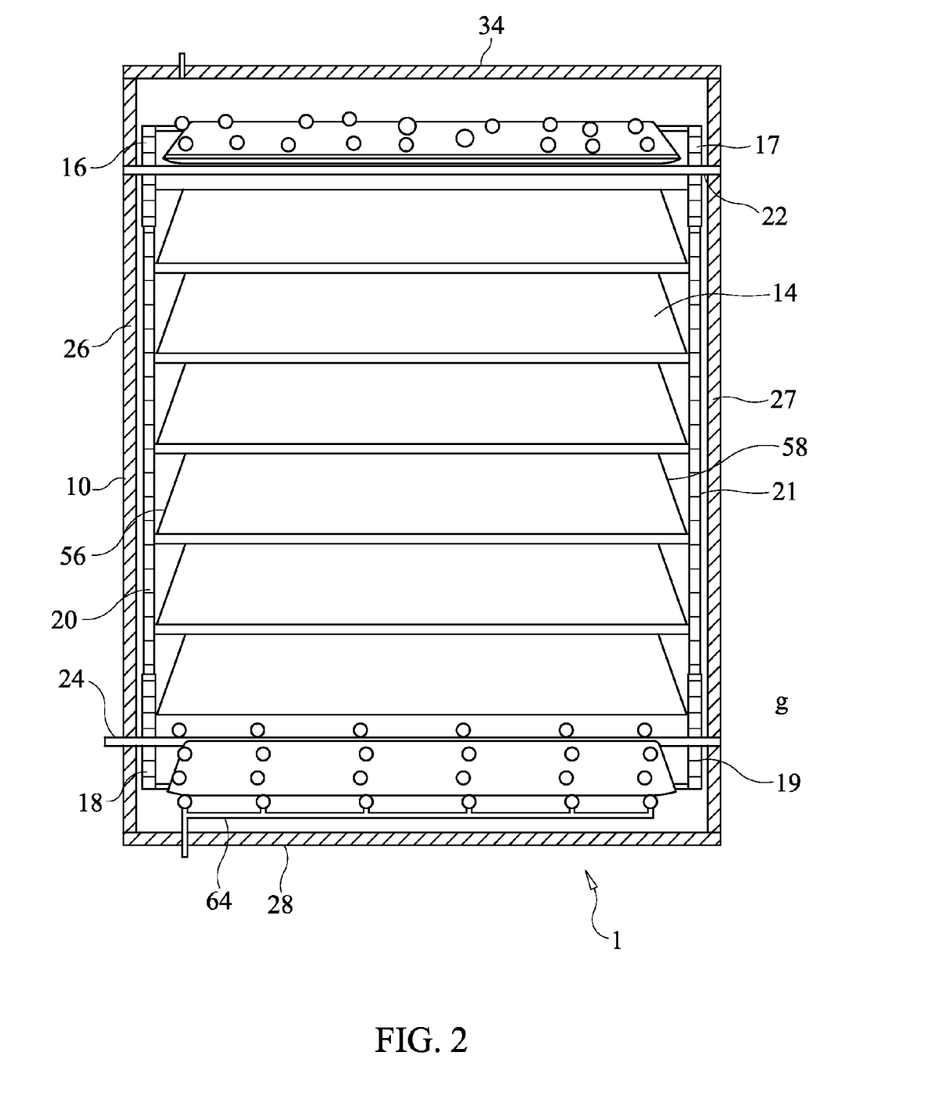
FIG. 2 is a cross sectional front view of a hydro blade turbine system in accordance with the present invention.
Figure 3:
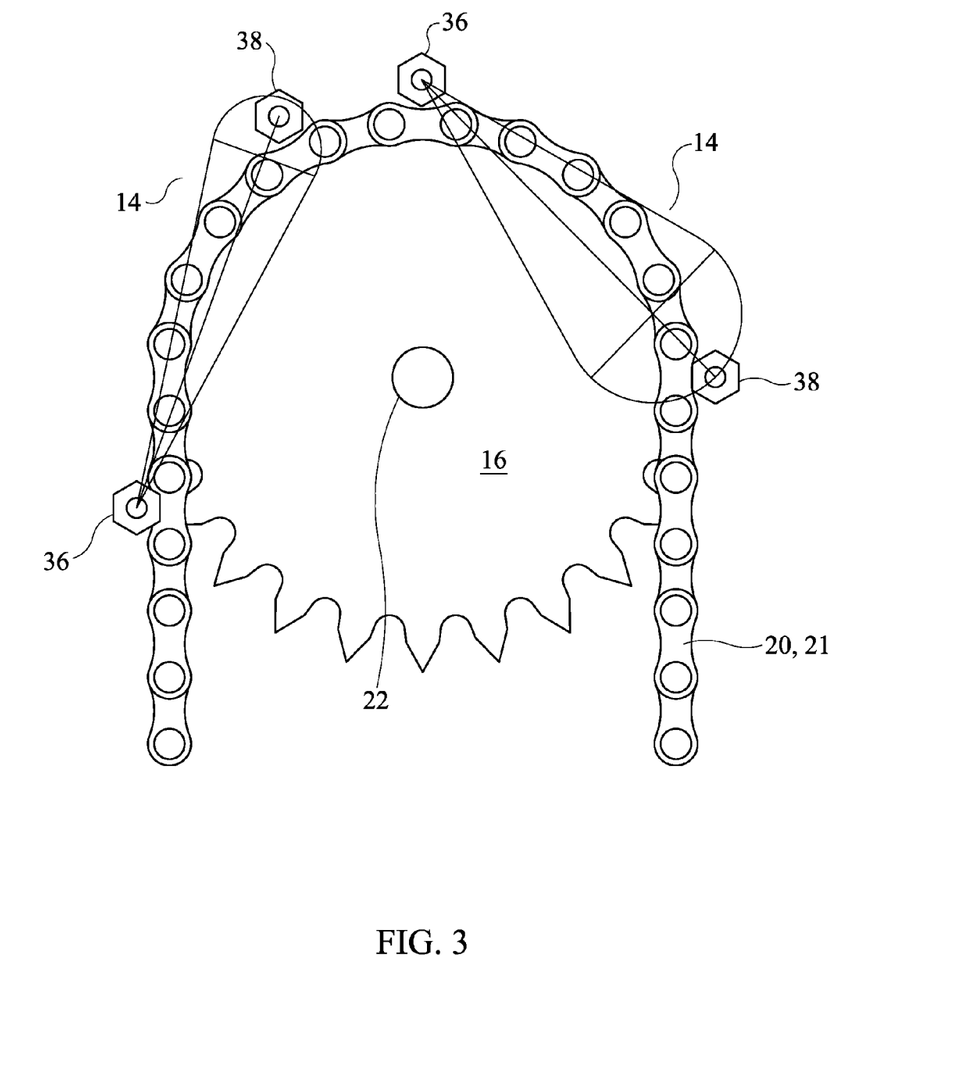
FIG. 3 is an enlarged end view of a idler gear of a hydro blade turbine system in accordance with the present invention.

With reference now to the drawings, and particularly to FIG. 2, there is shown a front view of a hydro blade turbine system 1. With reference to FIGS. 2-3, the hydro blade turbine system 1 preferably includes a housing 10, a current divider 12, a plurality of collapsible pockets 14, a pair of idler gears 16, 17, a pair of drive gears 18, 19, a pair of chains 20, 21, an idler shaft 22 and a drive shaft 24. The housing 10 may be a boiler, a chamber or a tank. The housing 10 preferably includes a pair of end plates 26, 27 a U-shaped base 28, a front plate 30, a back plate 32 and a U-shaped top plate 34. A first drive gear 18 is retained on one end of the drive shaft 24 and a second drive gear 19 is retained on a second end of the drive shaft 24. A first end of the drive shaft 24 is pivotally retained at a lower end of a first end plate 26 and a second end of the drive shaft 24 is pivotally retained at a lower end of a second end plate 27. A first idler gear 16 is retained on a first end of the idler shaft 22 and a second idler gear 17 is retained on a second end of the idler shaft 22. A first end of the idler shaft 22 is pivotally retained at an upper end of the first end plate 26 and a second end of the idler shaft 22 is pivotally retained at an upper end of the second end plate 27.

A first chain 20 is retained around the first idler and drive gears 16, 18 and a second chain 21 is retained around the second idler and drive gears 17, 19. A first end of the current divider 12 is attached to an inside surface of the first end plate 26, between the first idler and drive gears 16, 18 and a second end of the current divider 12 is attached to an inside surface of the second end plate 27, between the second idler and drive gears 17, 19. A first end of a plurality of top pivot rods 36 are attached around an outer perimeter of the first chain 20 and a second end of the plurality of top pivot rods 36 are attached around an outer perimeter of the second chain 21. A second end of a plurality of bottom pivot rods 38 are attached around an outer perimeter of the first chain 20 and a second end of the plurality of bottom pivot rods 38 are attached around an outer perimeter of the second chain 21.

Figure 4:
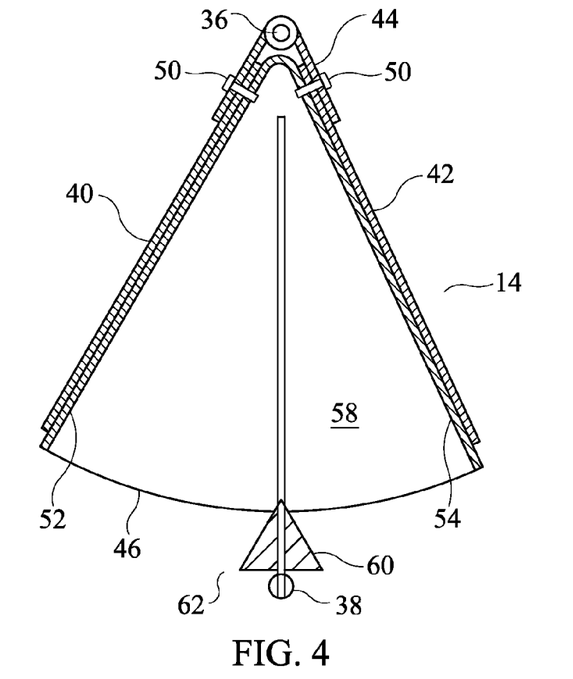
FIG. 4 is a cross sectional end view of a collapsible pocket of a hydro blade turbine system in accordance with the present invention.
Figure 4A:
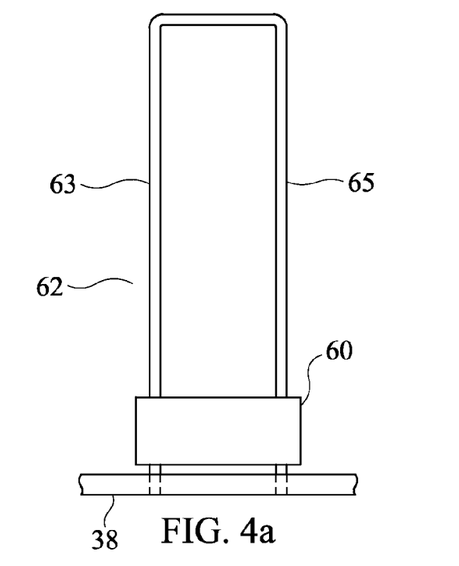
FIG. 4a is a front view of a bobber slidably retained on a bobber loop of a hydro blade turbine system in accordance with the present invention.

With reference to FIG. 4, each one of the plurality of collapsible pockets 14 include a first plate 40, a second plate 42, a hinge member 44, a pocket liner 46 and a bobber 48. One edge of the first and second plates 40, 42 are secured to the hinge member 44 with fasteners 50 any other suitable attached device or method. The pocket liner 46 includes a first side portion 52, a second side portion 54, a first end portion 56 and a second end portion 58. The pocket liner 46 is fabricated from a flexible and waterproof material. A first side of the first and second side portions 52, 54 are attached to each other. The first and second end portions 56, 58 terminate the first and second ends of the first and second sides portions 52, 54. The hinge member 44 is pivotally retained on the top pivot rod 36. At least one bobber 60 is disposed between the first and second side portions 52, 54, when the collapsible pocket 14 is closed. The at least one bobber 60 is retained on the bottom pivot rod 38 with a bobber loop 62. The bobber loop 62 includes a first leg 63 and a second leg 65. The first and second legs are attached to the bottom pivot rod 38 with any suitable method. As the plurality of collapsible pockets 14 rotate under the drive gears 18, 19, the at least one bobber 60 causes the first and second side portions 52, 54 to separate due to its buoyancy in water. The bobber 60 slides-up relative to the first and second legs 63, 65 and wedges itself between the first and second side portions 52, 54.

Figure 5:
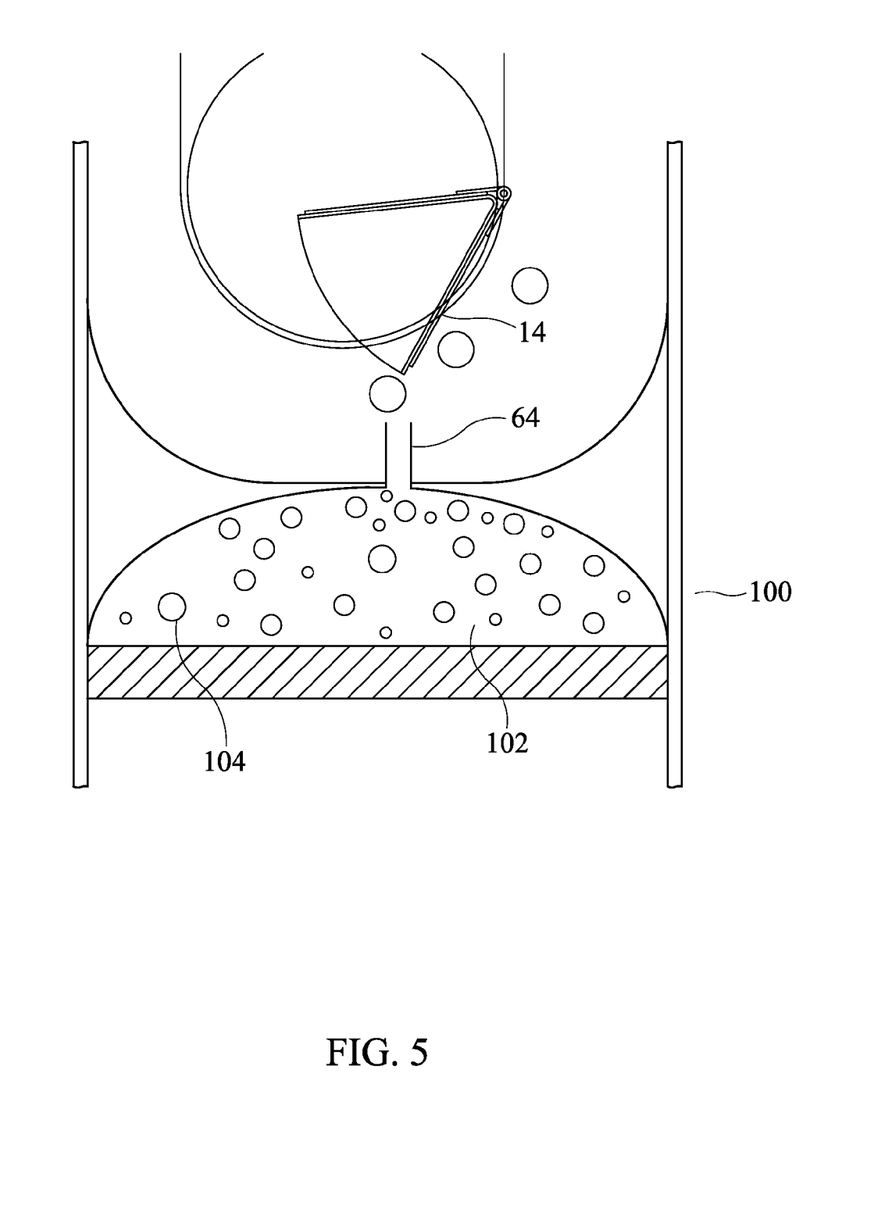
FIG. 5 is a cross sectional view of a boiler of a hydro blade turbine system in accordance with the present invention.

A first embodiment of the hydro blade turbine system 1 is located inside a chamber or a boiler 100. With reference to FIG. 5, if a boiler is used, a lower end of the hydro blade turbine 1 is located above a steam generation area 102 of the boiler 100. A top portion of the boiler 100 (not shown) encases the entire hydro blade turbine 1. When using the boiler 100, steam 104 from a bottom of the boiler 100 is captured by a steam manifold 64 and directed into a plurality of open collapsible pockets 14. If a chamber is used, a bottom of the hydro blade turbine 1 is located above a plurality of compressed air valves in a base of the chamber and the plurality of compressed air valves are directed into a plurality of partially open collapsible pockets 14. The air forces the plurality of collapsible pockets open 14 and upward, which rotate the idler and drive gears. The drive shaft 24 will pass through the first or second end plates 26, 27 and extend outside of the chamber. The hydro blade turbine system 1 in a chamber may be utilized to generate energy from various sources of compressed air, such as wind, wave, tidal and geopressure inside a chamber.

Figure 6:
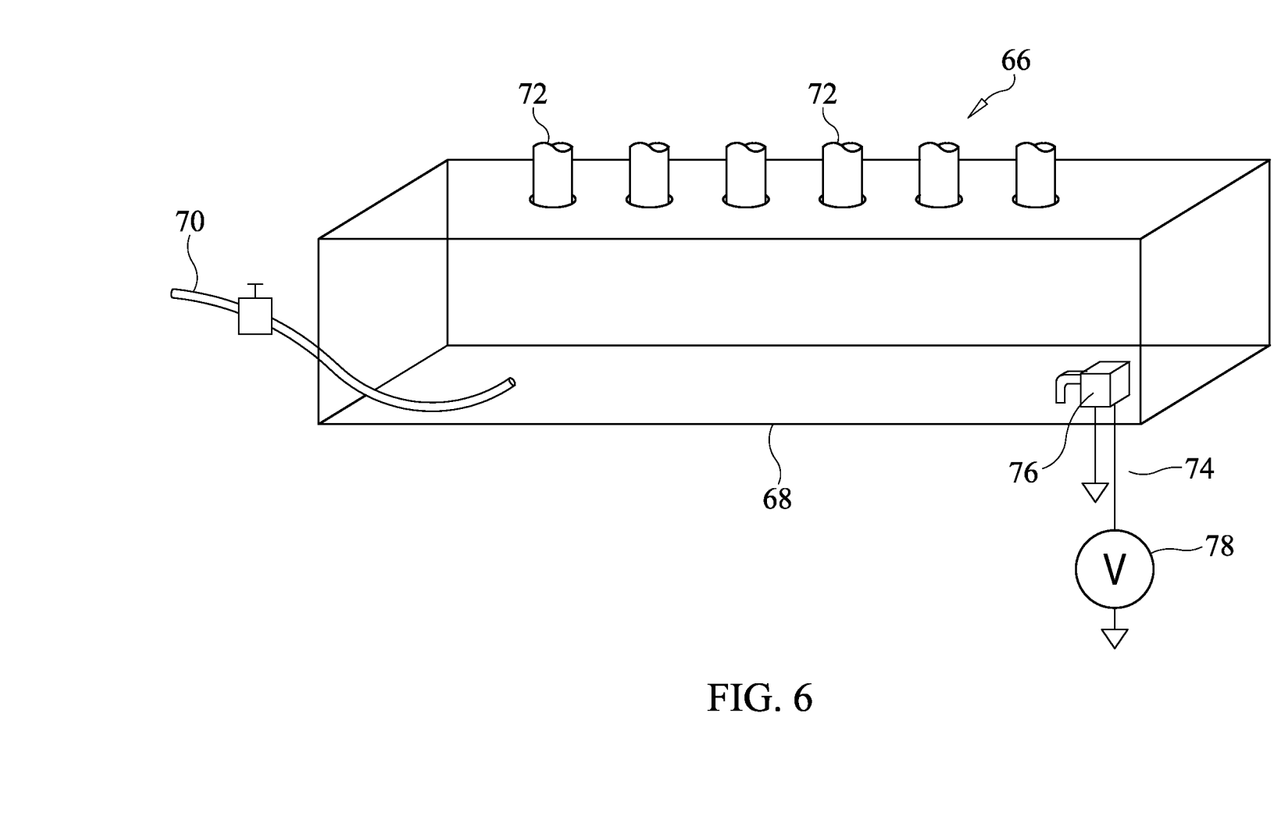
FIG. 6 is a perspective view of a gas propulsion unit of a hydro blade turbine system in accordance with the present invention.

With reference to FIG. 6, a second embodiment of the hydro blade turbine system 1 uses ignited natural gas to propel the plurality of collapsible pockets 14. A gas propulsion device unit 66 includes an ignition chamber 68, a supply of pressurized natural gas 70, a plurality of check valves 72 and an ignition source 74. The supply of pressurized gas 70 is connected to ignition chamber 68. The plurality of check valves 72 extend from a from top of the ignition chamber 68. The ignition source 74 is disposed inside the ignition chamber 68. The ignition source 74 preferably includes an igniter 76 and a power source 78. The plurality of check valves 72 are located at a bottom of the hydro blade turbine system 1. Exhaust pressure from igniting the pressurized natural gas 70 flows through the plurality of check valves 72 and into the plurality of partially open collapsible pockets 14. The ignition process is repeated to rotate the hydro blade turbine system 1.

Figure 7:
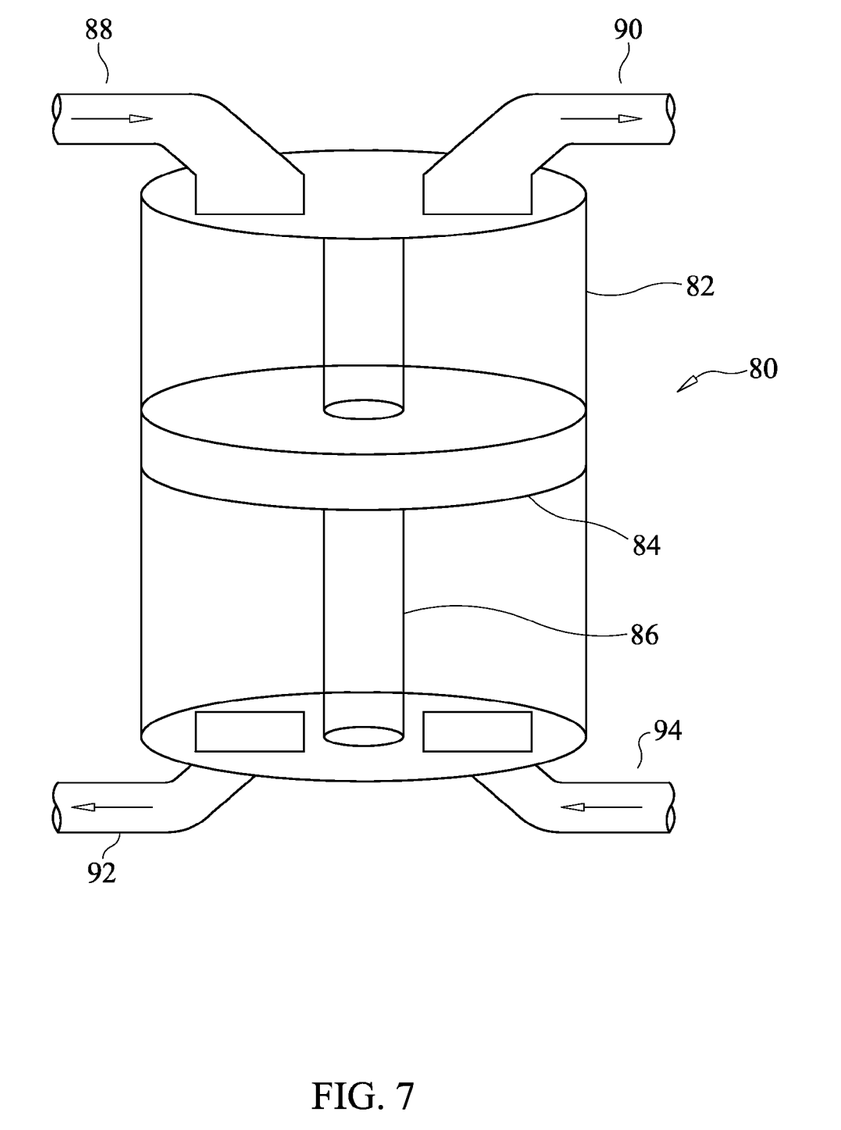
FIG. 7 is a perspective view of a steam converter of a hydro blade turbine system in accordance with the present invention.

A third embodiment of the hydro blade turbine system 1 uses steam to propel the plurality of collapsible pockets 14. The hydro blade turbine system 1 is retained in a chamber. With reference to FIG. 7, a steam converter 80 includes a cylinder 82, a disc 84 and stabilizing rod 86. An air input 88 and a pressurized air output 90 are formed on a top end of the cylinder 82. An air output 92 and a steam input 94 are formed on a bottom of the cylinder 82. The stabilizing rod 86 extends a length of the cylinder 82. A hole in a center of the disc 84 is sized to slidably receive the stabilizing rod 86. An outer perimeter of the disc 84 contacts an inner perimeter of the cylinder 82. The disc 84 falls to a bottom of the cylinder due to gravity. Excess air below the disc is pushed out from the air output 92. Pressurized steam is fed into steam input 94, which causes the disc 84 to rise. The rising disc 84 pushes air through the pressurized air output 90. The air input 88, the pressurized air output 90, the air output 92 and the steam input 94 preferably include check valves. The pressurized air is received by an air manifold located in a base of a housing (not shown). The air manifold is located to release air directly under the partially open collapsible pockets 14, which causes the hydro blade turbine system 1 to rotate.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A hydro blade turbine system comprising:
   a housing having opposing side ends, a bottom end and a top end;
   an idler shaft is pivotally retained at said opposing side ends of said housing, near said top end;
   a first idler gear is retained on a first end of said idler shaft, a second idler gear is retained on a second end of said idler shaft;
   a drive shaft is pivotally retained at said opposing side ends of said housing, near said bottom;
   a first drive gear is retained on a first end of said drive shaft, a second drive gear is retained on a second end of said drive shaft;
   a first chain is retained around said first drive gear and said first idler gear;
   a second chain is retained around said second drive gear and said second idler gear;
   a plurality of collapsible pockets, each one of said plurality of collapsible pockets are pivotally retained on said first and second chains, wherein a source of propulsion propels said plurality of collapsible pockets upward; and
   each one of said plurality of collapsible pockets includes a first plate, a second plate, a hinge member and a pocket liner, one edge of a first and second plates are retained by said hinge member, said pocket liner is disposed between said first and second end plates, a bobber is slidably retained in the pocket liner.

2. The hydro blade turbine system of claim 1 wherein:
said housing is one of a chamber, a boiler and a tank.

3. The hydro blade turbine system of claim 1 wherein:
said chamber includes a pair of end plates, a U-shaped base, a front plate, a back plate and a U-shaped top plate.

4. The hydro blade turbine system of claim 1 wherein:
said pocket liner includes a first side portion, a second side portion, a first end portion and a second end portion.

5. The hydro blade turbine system of claim 1 wherein:
said pocket liner is fabricated from a flexible material.

6. The hydro blade turbine system of claim 1 wherein:
the source of propulsion is one of air, steam and ignited natural gas.

7. A hydro blade turbine system comprising:
   a housing having opposing side ends, a bottom end and a top end;
   an idler shaft is pivotally retained at said opposing side ends of said housing, near said top end;
   a first idler gear is retained on a first end of said idler shaft, a second idler gear is retained on a second end of said idler shaft;
   a drive shaft is pivotally retained at said opposing side ends of said housing, near said bottom;
   a first drive gear is retained on a first end of said drive shaft, a second drive gear is retained on a second end of said drive shaft;
   a first chain is retained around said first drive gear and said first idler gear;
   a second chain is retained around said second drive gear and said second idler gear;
   a current divider extends between each end of said housing;
   a plurality of collapsible pockets, each one of said plurality of collapsible pockets are pivotally retained on said first and second chains, wherein a source of propulsion propels said plurality of collapsible pockets upward; and
   each one of said plurality of collapsible pockets includes a first plate, a second plate, a hinge member and a pocket liner, one edge of first and second plates are retained by said hinge member, said pocket liner is disposed between said first and second end plates, a bobber is slidably retained in the pocket liner.

8. The hydro blade turbine system of claim 7 wherein:
said housing is one of a chamber, a boiler and a tank.

9. The hydro blade turbine system of claim 7 wherein:
said chamber includes a pair of end plates, a U-shaped base, a front plate, a back plate and a U-shaped top plate.

10. The hydro blade turbine system of claim 7 wherein:
said pocket liner includes a first side portion, a second side portion, a first end portion and a second end portion.

11. The hydro blade turbine system of claim 7 wherein:
said pocket liner is fabricated from a flexible material.

12. The hydro blade turbine system of claim 7 wherein:
the source of propulsion is one of air, steam and ignited natural gas.

13. A hydro blade turbine system comprising:
   a housing having opposing side ends, a bottom end and a top end;
   an idler shaft is pivotally retained at said opposing side ends of said housing, near said top end;
   a first idler gear is retained on a first end of said idler shaft, a second idler gear is retained on a second end of said idler shaft;
   a drive shaft is pivotally retained at said opposing side ends of said housing, near said bottom;
   a first drive gear is retained on a first end of said drive shaft, a second drive gear is retained on a second end of said drive shaft;
   a first chain is retained around said first drive gear and said first idler gear;
   a second chain is retained around said second drive gear and said second idler gear;
   a plurality of collapsible pockets, each one of said plurality of collapsible pockets are pivotally retained on said first and second chains with a plurality of pivot rods, wherein a source of propulsion propels said plurality of collapsible pockets upward; and
   each one of said plurality of collapsible pockets includes a first plate, a second plate, a hinge member and a pocket liner, one edge of first and second plates are retained by said hinge member, said pocket liner is disposed between said first and second end plates, a bobber is slidably retained in the pocket liner.

14. The hydro blade turbine system of claim 13 wherein:
said housing is one of a chamber, a boiler and a tank.

15. The hydro blade turbine system of claim 13 wherein:
said chamber includes a pair of end plates, a U-shaped base, a front plate, a back plate and a U-shaped top plate.

16. The hydro blade turbine system of claim 13 wherein:
said pocket liner includes a first side portion, a second side portion, a first end portion and a second end portion.

17. The hydro blade turbine system of claim 13 wherein:
said pocket liner is fabricated from a flexible material.

\* \* \* \* \*